United States Patent
Truong et al.

(10) Patent No.: US 11,801,642 B2
(45) Date of Patent: *Oct. 31, 2023

(54) RESIN LEVEL DETECTION IN ADDITIVE MANUFACTURING

(71) Applicant: Carbon, Inc., Redwood City, CA (US)

(72) Inventors: Ronald A. Truong, San Mateo, CA (US); Steven R. Katzman, San Jose, CA (US)

(73) Assignee: Carbon, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/428,786

(22) PCT Filed: Feb. 25, 2020

(86) PCT No.: PCT/US2020/019679
§ 371 (c)(1),
(2) Date: Aug. 5, 2021

(87) PCT Pub. No.: WO2020/176487
PCT Pub. Date: Sep. 3, 2020

(65) Prior Publication Data
US 2023/0053973 A1    Feb. 23, 2023

Related U.S. Application Data

(60) Provisional application No. 62/810,618, filed on Feb. 26, 2019.

(51) Int. Cl.
*B29C 64/386* (2017.01)
*B29C 64/307* (2017.01)
(Continued)

(52) U.S. Cl.
CPC .......... *B29C 64/386* (2017.08); *B29C 64/245* (2017.08); *B29C 64/307* (2017.08);
(Continued)

(58) Field of Classification Search
CPC ... B29C 64/386; B29C 64/245; B29C 64/307; B33Y 10/00; B33Y 30/00; B33Y 50/00
See application file for complete search history.

(56) References Cited

U.S. PATENT DOCUMENTS 5,182,715 A     1/1993  Vorgitch et al.
10,933,580 B2 * 3/2021  Truong ................ B29C 64/277
(Continued)

FOREIGN PATENT DOCUMENTS

EP         3428585 A1    1/2019
WO      2015031227 A1    3/2015

OTHER PUBLICATIONS

International Search Report and Written Opinion for PCT/US2020/019679 dated Jun. 29, 2020, 16 pages.

*Primary Examiner* — Nahida Sultana
(74) *Attorney, Agent, or Firm* — Myers Bigel, P.A.

(57) ABSTRACT

In some embodiments, a method of determining the fill level of a resin pool in a bottom-up additive manufacturing apparatus includes the steps of: (a) providing an additive manufacturing apparatus including a build platform and a light transmissive window (12), the build platform (15) and the window (12) defining a build region therebetween, with the window (12) carrying a resin pool, the pool having a resin top surface portion; (b) advancing the build platform (15) and the window (12) towards one another until the build platform (15) contacts the resin top surface portion; (c) detecting the impact of the build platform (15) with the resin top surface portion; and (d) determining the fill level of the resin pool from the detected impact.

16 Claims, 3 Drawing Sheets

(51) Int. Cl.
*B29C 64/245* (2017.01)
*B33Y 10/00* (2015.01)
*B33Y 30/00* (2015.01)
*B33Y 50/00* (2015.01)

(52) U.S. Cl.
CPC .............. *B33Y 10/00* (2014.12); *B33Y 30/00* (2014.12); *B33Y 50/00* (2014.12)

(56) References Cited

U.S. PATENT DOCUMENTS

| | | |
|---|---|---|
| 11,331,858 B2 * | 5/2022 | Eideloth ................ B22F 10/32 |
| 2017/0057174 A1 | 3/2017 | Megretski et al. |
| 2017/0368747 A1 | 12/2017 | Nolet et al. |
| 2018/0345584 A1 | 12/2018 | Tanner |
| 2020/0001525 A1 * | 1/2020 | Wynne ................... B29C 64/20 |
| 2021/0255025 A1 * | 8/2021 | Huang ................... B33Y 40/00 |
| 2021/0293351 A1 * | 9/2021 | Dragomirescu ....... B60K 15/03 |
| 2022/0032538 A1 * | 2/2022 | Michalica ............. B29C 64/232 |
| 2022/0402211 A1 * | 12/2022 | Stadlmann ............ B29C 64/393 |

\* cited by examiner

RESIN LEVEL DETECTION IN ADDITIVE MANUFACTURING

RELATED APPLICATIONS

This application is a 35 U.S.C. § 371 national phase entry of International Application No. PCT/US2020/019679, filed Feb. 25, 2020, which claims the benefit of U.S. Provisional Patent Application Ser. No. 62/810,618, filed Feb. 26, 2019, the disclosures of which are incorporated by reference herein in their entirety.

FIELD OF THE INVENTION

The present invention concerns stereolithography methods and apparatus, particularly those for carrying out bottom-up additive manufacturing, such as continuous liquid interface production.

BACKGROUND OF THE INVENTION

A group of additive manufacturing techniques sometimes referred to as "stereolithography" creates a three-dimensional object by the sequential polymerization of a light polymerizable resin. Such techniques may be "bottom-up" techniques, where light is projected into the resin on the bottom of an object growing on a build platform above a light transmissive window, or "top down" techniques, where light is projected onto the resin on top of the growing object, which is then immersed downward into the pool of resin.

The introduction of more rapid stereolithography techniques sometimes referred to as continuous liquid interface production (CLIP), coupled with the introduction of "dual cure" resins for additive manufacturing, has expanded the usefulness of stereolithography from prototyping to manufacturing (see, e.g., U.S. Pat. Nos. 9,211,678; 9,205,601; and 9,216,546 to DeSimone et al.; and also in J. Tumbleston, D. Shirvanyants, N. Ermoshkin et al., Continuous liquid interface production of 3D Objects, *Science* 347, 1349-1352 (2015); see also Rolland et al., U.S. Pat. Nos. 9,676,963, 9,453,142 and 9,598,606). For such purposes, bottom-up stereolithography is preferred, as the pool of resin (sometimes provided on a "window cassette") can be more shallow and hence smaller in volume.

Resin pools in bottom-up systems cannot be too shallow, or adequate resin may not flow into the build region when the build platform is advanced downward, resulting in failed production of objects. Similarly, the resin pool cannot be too deep, or advancing of the build platform into the pool may cause the displaced volume of resin (generally viscous) to spill out over the window cassette. Measuring of resin fill levels, however, is difficult: Contact measurement techniques require consistent and uniform cleaning of resin contact surfaces, and non-contact (generally optical) measurement techniques can produce variable results when different resin formulations (for example, clear versus opaque) are used. Accordingly, there is a need for new approaches to resin level measurement in bottom-up stereolithography apparatus.

SUMMARY OF THE INVENTION

A first aspect of the present invention is a method of determining the fill level of a resin pool in a bottom-up additive manufacturing apparatus includes the steps of: (a) providing an additive manufacturing apparatus including a build platform and a light transmissive window, the build platform and the window defining a build region there between, with the window carrying a resin pool, the pool having a resin top surface portion; (b) advancing the build platform and the window towards one another until the build platform contacts the resin top surface portion; (c) detecting the impact of the build platform with the resin top surface portion; and (d) determining the fill level of the resin pool from the detected impact.

In some embodiments, the method further includes: producing an object on the build platform from the resin with the apparatus when (i) the fill level is above a minimum fill level and/or (ii) below a maximum fill level.

In some embodiments, the method further includes: halting production of objects on the build platform from the resin with the apparatus, and/or generating an alarm signal, when (i) the fill level is below a minimum fill level and/or (ii) above a maximum fill level.

In some embodiments, the apparatus further includes a resin dispenser, and the method further includes the step of: dispensing additional resin into the pool when the fill level is below a minimum fill level (the dispenser can be an on-board or dedicated dispenser, a robotic dispenser operatively associated with the machine or a group of machines, etc.).

In some embodiments, the apparatus includes a force sensor operatively associated with the build platform and/or the light transmissive window, and the detecting step is carried out by detecting force exerted on the force sensor.

In some embodiments, wherein the window is stationary in the lateral (X, Y) dimensions.

In some embodiments, the method further includes: initiating production of an object on the build platform from the resin by additive manufacturing; and detecting a collision impact between the carrier platform and a fallen object on the window, or a collision impact between a dangling object on the carrier platform and the window.

In some embodiments, the method further includes halting the production and/or generating an alarm signal when the collision impact is greater than the detected impact of the build platform with the resin top surface portion or a predetermined expected impact of the build platform with the resin top surface portion (where a predetermined expected impact is based on input of specific resin type, viscosity, or the like).

In some embodiments, the step of detecting an impact of the build platform with the resin top surface portion, and the step of detecting a collision impact when present, are carried out with a force sensor (for example, a strain gauge) operatively associated with the carrier platform and/or the window.

A further aspect of the present invention is an apparatus useful for making a three-dimensional object from a polymerizable resin, which apparatus includes; (a) a build platform on which a three-dimensional object can be made; (b) a light transmissive window having a build surface operatively associated with the build platform, the build platform and the build surface defining a build region therebetween, the window configured to support a resin pool thereon; (e) an elevator assembly operatively associated with the build platform and/or the window, the elevator assembly configured for advancing the build platform and the window member away from one another to draw the polymerizable liquid into the build region; (d) a light engine operatively associated with the window and positioned to irradiate the build region with light to form a growing three-dimensional object from the resin; (e) a force sensor (e.g., a strain gauge) operatively associated with the platform and/or the window and configured to detect an impact of the build platform with a top surface portion of the resin pool; and (f) a controller operatively associated with the carrier platform, the light engine, and the force sensor, the controller configured to determine a resin pool fill level from a detected impact of the carrier platform with a resin pool top surface portion.

In some embodiments of the foregoing, the window is stationary in the lateral (X, Y) dimensions.

In some embodiments of the foregoing, the apparatus further includes a resin dispenser operatively associated with the controller.

In some embodiments of the foregoing, the light engine includes a light source (e.g., a laser) in combination with a patterning array (e.g., a liquid crystal display array or a digital micromirror array).

In some embodiments of the foregoing, the controller of the apparatus is configured to carry out any of the methods described above.

R. Truong, *Continuous Liquid Interface Production with Force Monitoring and Feedback*, PCT Application WO 2018/111533 (published 21 Jun. 2018), describes the use of a force sensor during production of an object on an additive manufacturing apparatus to enhance efficiency of production, but does not suggest that such a force sensor could be used to measure resin fill levels prior to production of the object, and does not suggest such a sensor could be used to detect collisions with a fallen or dangling object prior to or during production of an object.

DETAILED DESCRIPTION OF ILLUSTRATIVE EMBODIMENTS

Figure 1:
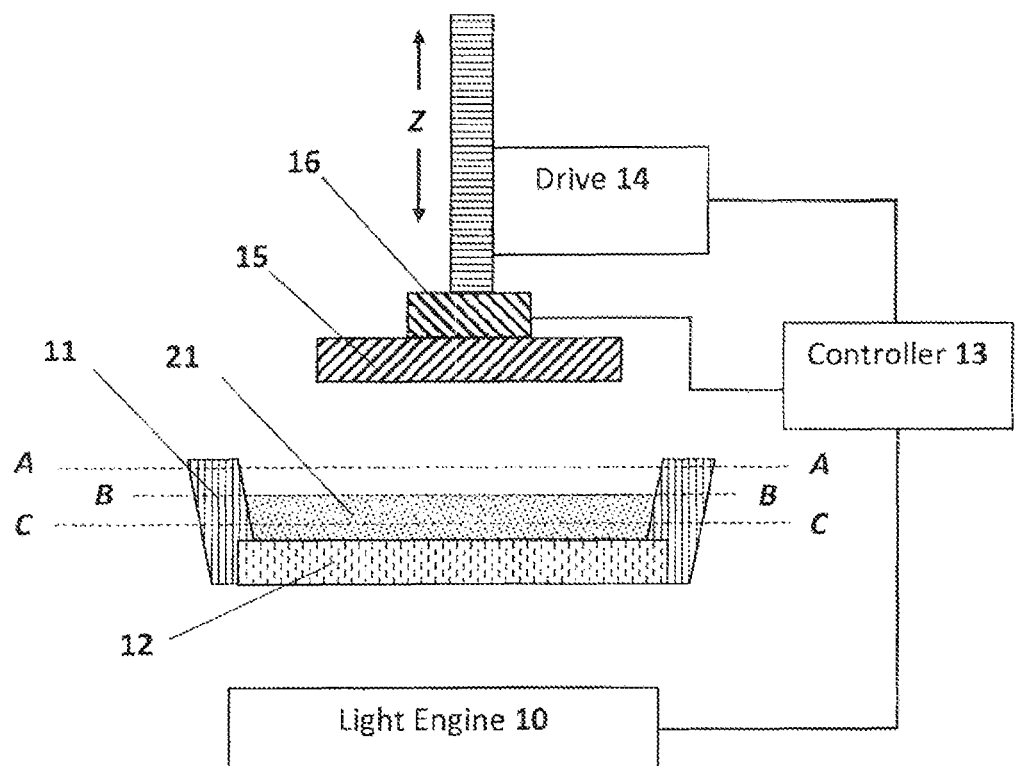
FIG. 1 schematically illustrates an apparatus useful for carrying out the present invention, prior to initiating production of an object and prior to determining resin fill level.

The present invention is now described more fully hereinafter with reference to the accompanying drawings, in which embodiments of the invention are shown. This invention may, however, be embodied in many different forms and should not be construed as limited to the embodiments set forth herein; rather these embodiments are provided so that this disclosure will be thorough and complete and will fully convey the scope of the invention to those skilled in the art.

Like numbers refer to like elements throughout. In the figures, the thickness of certain lines, layers, components, elements or features may be exaggerated for clarity. Where used, broken lines illustrate optional features or operations unless specified otherwise.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "contacting," etc., another element, it can be directly on, attached to, connected to, coupled with and/or contacting the other element or intervening elements can also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature can have portions that overlap or underlie the adjacent feature.

Spatially relative terms, such as "under," "below," "lower," "over," "upper" and the like, may be used herein for ease of description to describe an element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus the exemplary term "under" can encompass both an orientation of over and under. The device may otherwise be oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only, unless specifically indicated otherwise.

It will be understood that, although the terms first, second, etc., may be used herein to describe various elements, components, regions, layers and/or sections, these elements, components, regions, layers and/or sections should not be limited by these terms. Rather, these terms are only used to distinguish one element, component, region, layer and/or section, from another element, component, region, layer and/or section. Thus, a first element, component, region, layer or section discussed herein could be termed a second element, component, region, layer or section without departing from the teachings of the present invention. The sequence of operations (or steps) is not limited to the order presented in the claims or figures unless specifically indicated otherwise.

1. General Methods and Apparatus.

Suitable additive manufacturing apparatus include those configured for carrying out bottom-up additive manufacturing. Such methods are known and described in, for example, U.S. Pat. No. 5,236,637 to Hull, U.S. Pat. Nos. 5,391,072 and 5,529,473 to Lawton, U.S. Pat. No. 7,438,846 to John, U.S. Pat. No. 7,892,474 to Shkolnik, U.S. Pat. No. 8,110,135 to El-Siblani, U.S. Patent Application Publication No. 2013/0292862 to Joyce, and US Patent Application Publication No. 2013/0295212 to Chen et al. The disclosures of these patents and applications are incorporated by reference herein in their entirety.

In some embodiments, the additive manufacturing step is carried out by one of the family of methods sometimes referred to as continuous liquid interface production (CLIP). CLIP is known and described in, for example, U.S. Pat. Nos. 9,211,678; 9,205,601; 9,216,546; and others; in J. Tumbleston et al., Continuous liquid interface production of 3D Objects, *Science* 347, 1349-1352 (2015); and in R. Janusziewcz et al., Layerless fabrication with continuous liquid interface production, *Proc. Natl. Acad. Sci. USA* 113, 11703-11708 (Oct. 18, 2016). Other examples of methods and apparatus for carrying out particular embodiments of CLIP, or of additive manufacturing, include but are not limited to those described in B. Feller. U.S. Patent App. Pub. No. US 2018/0243976 (published Aug. 30, 2018); M. Panzer and J. Tumbleston, U.S. Patent App Pub. No. US 2018/0126630 (published May 10, 2018); K. Willis and B. Adzima, U.S. Patent App Pub. No. US 2018/0290374 (Oct. 11, 2018); Batchelder et al., U.S. Patent App Pub. No. US 2017/0129169 (May 11, 2017); Sun and Lichkus, U.S. Patent App Pub. No. US 2016/0288376 (Oct. 6, 2016); Willis et al., U.S. Patent App Pub. No. US 2015/0360419 (Dec. 17, 2015); Lin et al., U.S. Patent App Pub. No. US 2015/0331402 (Nov. 19, 2015); and a D. Castanon, U.S. Patent App Pub. No. US 2017/0129167 (May 11, 2017), the disclosures of which are incorporated by reference herein in their entirety.

2. Implementation of Resin Level Sensing By Impact Detection.

Figure 2:
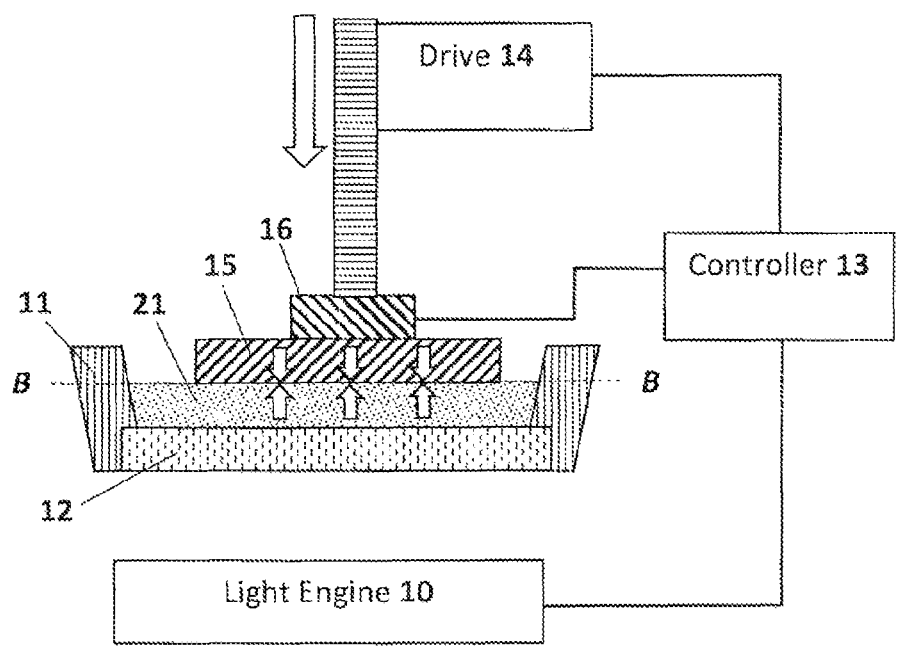
FIG. 2 is similar to FIG. 1, except that the build platform has now been advanced down to contact the resin top surface portion, so that impact can be detected and resin fill level determined.

FIGS. 1-2 schematically illustrate an apparatus useful for carrying out the present invention. In general, the apparatus includes a light engine 10, a window (or "build plate") 12, a controller 13, and elevator and drive assembly 14. A carrier platform (or "carrier plate") 15 is mounted to the elevator and drive assembly as in conventional apparatus, but with a force sensor 16 operatively associated therewith. The window 12 may be provided as part of a "cassette" having a frame 11, which cassette is removable from the overall apparatus. A polymerizable liquid or resin 21 is provided on top of the window 12, the resin having a fill level B-B, which fill level is preferably positioned between a maximum fill level A-A and a minimum fill level C-C. The three sets of arrows facing one another in FIG. 2 illustrate the impact of the carrier platform 15 with the surface portion of the resin 21 when the carrier platform 15 is advanced to the resin.

The window 12 may be impermeable or semipermeable to an inhibitor of polymerization (e.g. oxygen), depending on which particular approach for carrying out additive manufacturing is employed. In some embodiments, the window 12 comprises a fluoropolymer, in accordance with known techniques.

Any suitable light engine 11, including any of a variety of light sources and/or patterning elements, may be used, including lasers (e.g., scanning lasers as in traditional stereolithography), liquid crystal display (LCD) panels, digital micromirror displays (DMDs), etc. A single light engine may be used, or a tiled set of light engines may be used, depending on the size of the window 12 and the desired resolution.

While the schematic suggests that advancing is accomplished by lowering the carrier on the elevator, note also that advancing may be achieved by providing a fixed or static carrier, and by mounting the window and light engine on an elevator beneath the same, which can then be raised.

Any suitable device may be used as force sensor 16. Examples include, but are not limited to, mechanical tactile sensors, capacitive force sensors, metal strain gauges, semiconductor strain gauges, conductive elastomers, carbon felt and carbon fiber sensors, piezoelectric force sensors, pyroelectric force sensors, optical force sensors, magnetic force sensors, ultrasonic force sensors, electrochemical force sensors, etc., including combinations thereof. See, e.g., Matthias Fassler, *Force Sensing Technologies* (Swiss Federal Institute of Technology Zurich, Spring Term 2010). One suitable example is the Omega LCM202-1KN Miniature Metric Universal Load Cell, available from Omega Engineering, Inc. (800 Connecticut Ave., Suite 5N01, Norwalk, Conn. 06854 USA). Any suitable configuration of the force sensor or load cell may be used, including but not limited to a single load cell mounted (or "sandwiched") in-line between the carrier and the elevator. The three sensor may include multiple force sensors providing an averaged output (e.g., sandwiched between a compression plate to equalize load), and/or may include multiple force sensors providing independent data from multiple regions of the carrier. In addition, force sensing can be carded out by sensing motor current or torque, or any other direct or indirect measure of force.

Figure 3:
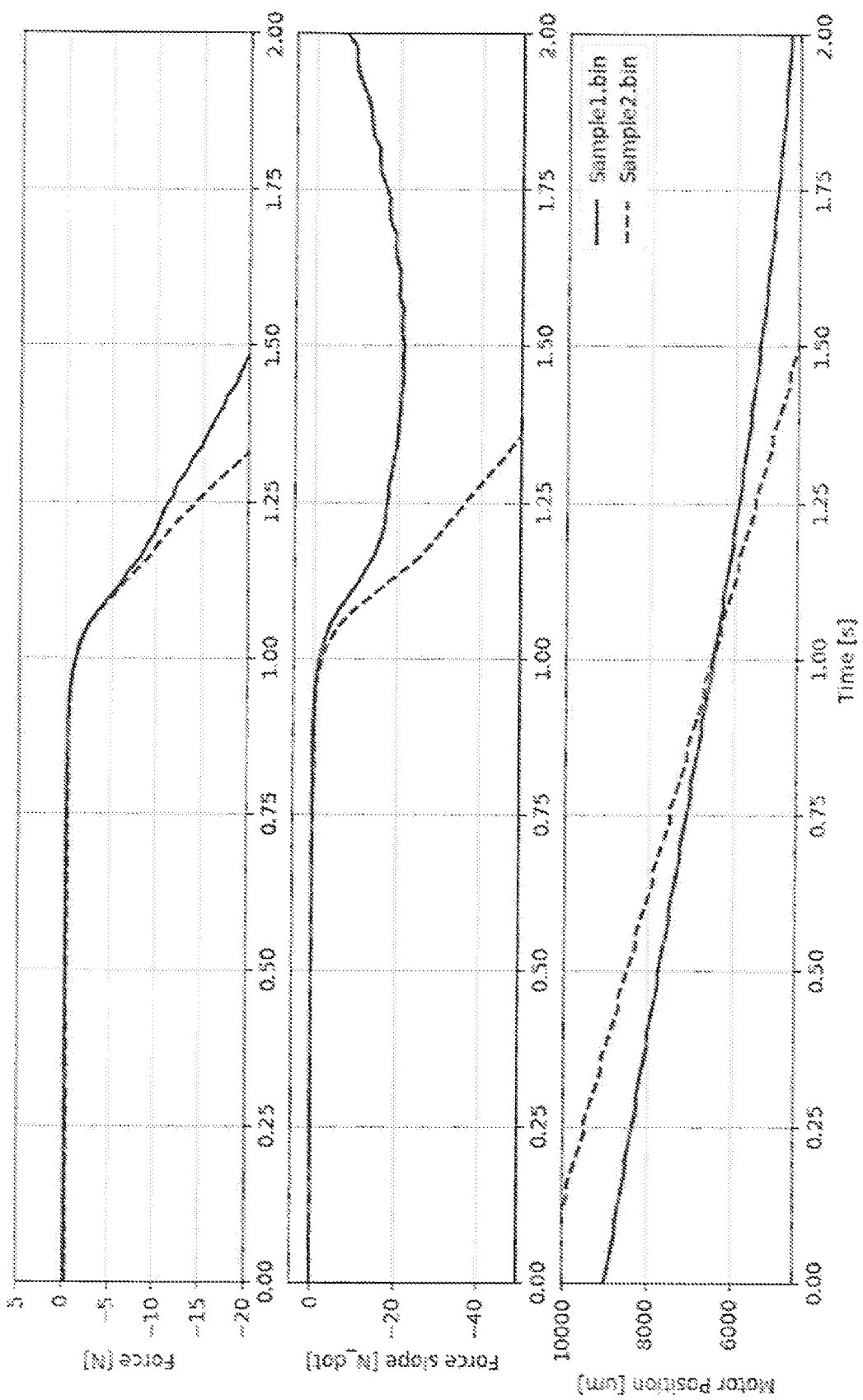
FIG. 3 illustrates impact detection in two different cases, where carrier platforms were advanced into a resin pool at different speeds.

In one embodiment, where the apparatus can accept interchangeable resin cassettes that have different dimensions, the present invention can be carried out by configuring the controller as follows: (1) Move the carrier platform into the resin pool; (2) Measure the impulse in the force slope; (3) Apply a simple threshold on the force slope to trigger "Detection." (4) At "Detection" instance, output the current motor position as the detected resin level. (5) Compute the resin volume (based on detected resin level, and window cassette dimensions). (6) If the resin volume detected is less than the resin volume required, trigger abort, resin refill, and/or alarm signal (or, if the resin volume detected is too great such that an overflow of resin during production of the object could occur, then trigger abort and/or an alarm signal). A sample implementation of the foregoing method is illustrated in FIG. 3, where the data has been synchronized to align the detection event at t=1.0 second. The force slope threshold was set to −2 N/s. Note that a greater speed of movement yields a large impulse).

An alternate embodiment can be carried out as follows: (1) Move the platform to a safe "out of resin" location. (2) Re-zero any DC offsets in force signal from the elevator motor. (3) Move the platform at any speed into the resin. (4) Measure force, which thereby provides buoyancy force. (5) Apply a simple threshold on the measured force to trigger "Detection." (6) At "Detection" instance, output the current motor position as the detected resin level. (7) Compute the resin volume (based on the resin level, and cassette geometry dimensions). (8) If the resin volume is detected less than (or greater than) the resin volume required, trigger abort, refill, and/or alarm (as appropriate). While both methods should yield similar results, the method described first with reference to FIG. 3 is preferred as it does not require a calibration step.

Note that, where interchangeable cassettes are not employed, or where all cassettes have the same dimensions and volume, the steps of converting resin level to resin volume described in the methods and systems above can be eliminated.

In some embodiments, the force sensor may be also used by the apparatus to determine when resin flow into the build region is substantially completed, so as to facilitate or speed production of objects with the apparatus, as described in R. Truong, *Continuous Liquid Interface Production with Force Monitoring and Feedback*, PCT Application WO 2018/111533 (published 21 Jun. 2018).

Figure 4A:
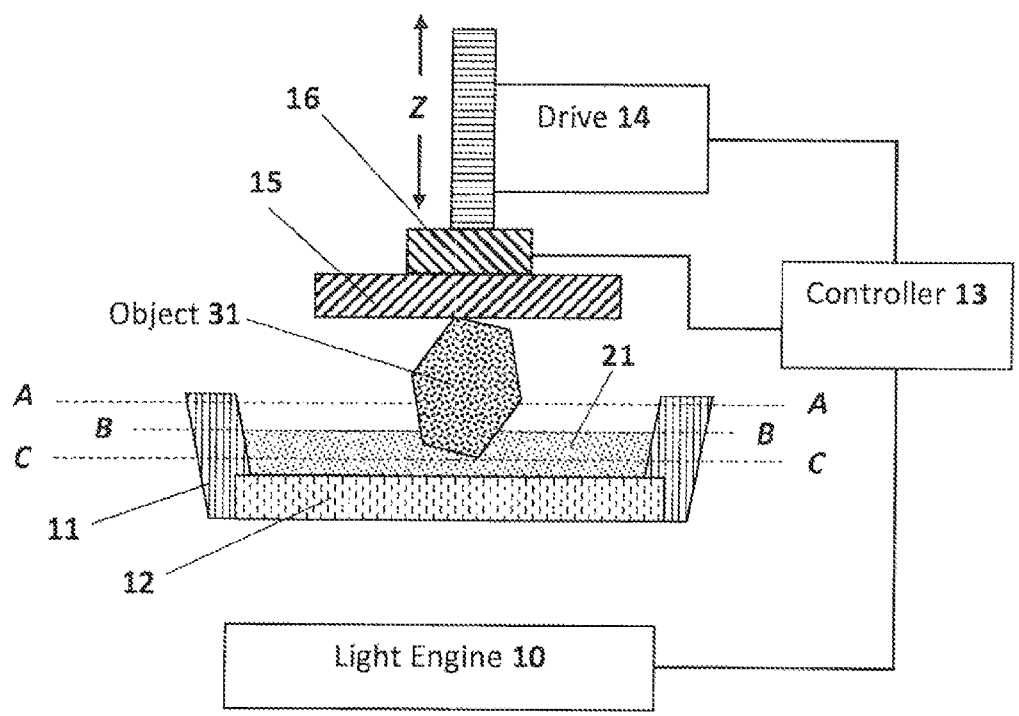
FIG. 4A schematically illustrates a process and apparatus in which the growing object is partially separated from the build platform (i.e., a "dangling" object) and may collide with the window if the process is continued.
Figure 4B:
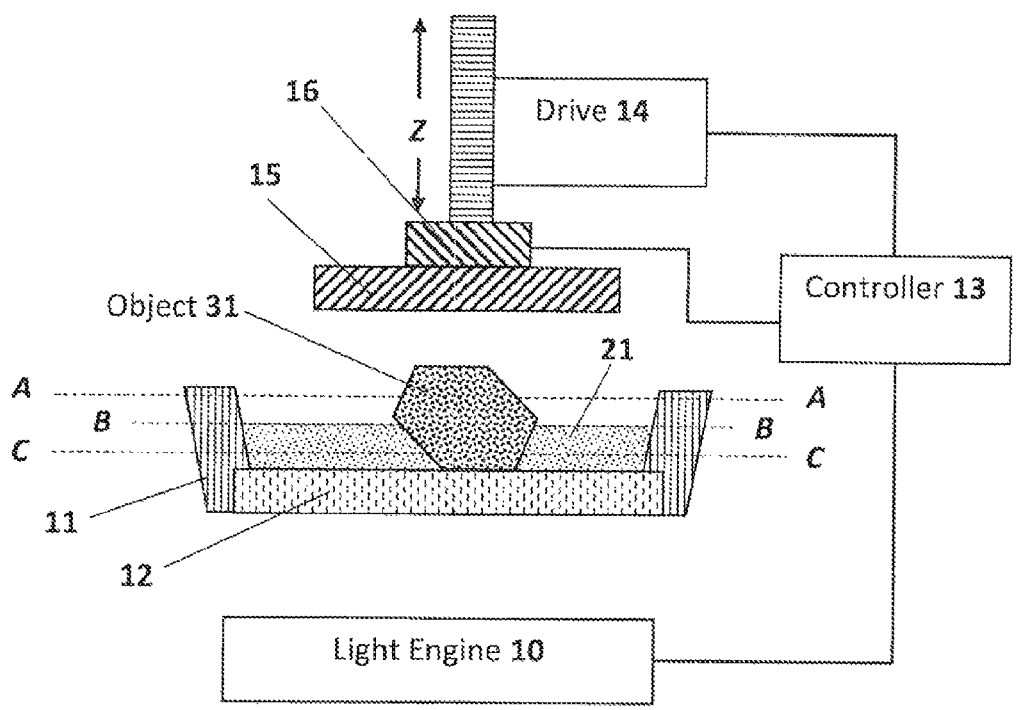
FIG. 4B schematically illustrates a process and apparatus in which a growing object has fully separated from the carrier platform, and may collide with the carrier platform if the process is continued.

As schematically illustrated in FIGS. 4A-4B, in some embodiments the force sensor may also be used (in addition to or instead of any of the foregoing functions) to detect collisions between the carrier platform 15 and a separated object 31 that has fallen onto the window 12 (FIG. 4B), or collisions between the window and a partially separated (or "dangling") object (FIG. 4A). When process failures like this occur, it can be important to halt production to avoid damage to the window when the carrier platform collides with the fallen object, or the dangling object collides with the window, waste of production time and/or resin, etc. For these purposes, in some embodiments, controller 13 includes a predetermined data set (i.e., a "golden data set") for a production process where such no such failure and collision occurs, and is configured to compare that data set to data acquired during actual production. Force is compared at multiple positions of the elevator drive, and an error between force sensed during actual production and the predetermined data set is computed. If the error exceeds a threshold, then it is flagged as a collision. Upon detection of a collision, the controller can then be configured to halt production, withdraw/retract the carrier platform, generate an alarm (including but not limited to visual and auditory alarms), or the like (including combinations thereof). In some (but not all) embodiments, the collision detection function is implemented in combination with the resin level detection function, so that the controller can be configured to differentiate between force exerted upon impact with the resin pool from force exerted upon an undesired collision, to reduce false positive collision detection.

The foregoing is illustrative of the present invention, and is not to be construed as limiting thereof. The invention is defined by the following claims, with equivalents of the claims to be included therein.

We claim:

1. A method of determining the fill level of a resin pool in a bottom-up additive manufacturing apparatus, comprising the steps of:
   (a) providing an additive manufacturing apparatus including a build platform and a light transmissive window, said build platform and said window defining a build region there between, with said window carrying a resin pool, said pool having a resin top surface portion;
   (b) advancing said build platform and said window towards one another until said build platform contacts said resin top surface portion;
   (c) detecting the impact of said build platform with said resin top surface portion; and
   (d) determining the fill level of said resin pool from said detected impact.

2. The method of claim 1, further comprising:
   producing an object on said build platform from said resin with said apparatus when (i) said fill level is above a minimum fill level and/or (ii) below a maximum fill level.

3. The method of claim 1, further comprising:
   halting production of objects on said build platform from said resin with said apparatus, and/or generating an alarm signal, when (i) said fill level is below a minimum fill level and/or (ii) above a maximum fill level.

4. The method of claim 1, said apparatus further comprising a resin dispenser, said method further comprising the step of:
   dispensing additional resin into said pool when said fill level is below a minimum fill level.

5. The method of claim 1, wherein said apparatus includes a force sensor operatively associated with said build platform and/or said light transmissive window, and said detecting step is carried out by detecting force exerted on said force sensor.

6. The method of claim 1, wherein said window is stationary in the lateral (X, Y) dimensions.

7. The method of claim 1, further comprising:
   initiating production of an object on said build platform from said resin by additive manufacturing; and
   detecting a collision impact between said build platform and a fallen object on said window, or a collision impact between a dangling object on said build platform and said window.

8. The method of claim 7, further comprising halting said production and/or generating an alarm signal when said collision impact is greater than said detected impact of said build platform with said resin top surface portion or a predetermined expected impact of said build platform with said resin top surface portion.

9. The method of claim 7, wherein said step of detecting the impact of said build platform with said resin top surface portion and said step of detecting a collision impact, are carried out with a force sensor operatively associated with said build platform and/or said window.

10. The method of claim 9, wherein said force sensor comprises a strain gauge.

11. An apparatus for making a three-dimensional object from a polymerizable resin, comprising:
   (a) a build platform on which a three-dimensional object can be made;
   (b) a light transmissive window having a build surface operatively associated with said build platform, said build platform and said build surface defining a build region therebetween, said window configured to support a resin pool thereon;
   (c) an elevator assembly operatively associated with said build platform and/or said window, said elevator assembly configured for advancing said build platform and/or said window member away from one another to draw said polymerizable liquid into said build region;
   (d) a light engine operatively associated with said window and positioned to irradiate said build region with light to form a growing three-dimensional object from said resin;
   (e) a force sensor operatively associated with said platform and/or said window and configured to detect an impact of said build platform with a top surface portion of said resin pool; and
   (f) a controller operatively associated with said build platform, said light engine, and said force sensor, said controller configured to determine a resin pool fill level from a detected impact of said build platform with a resin pool top surface portion.

12. The apparatus of claim 11, wherein said window is stationary in the lateral (X, Y) dimensions.

13. The apparatus of claim 11, further comprising:
(g) a resin dispenser operatively associated with said controller.

14. The apparatus of claim 11, wherein said light engine comprises a light source in combination with a patterning array.

15. The apparatus of claim 11, wherein said force sensor comprises a strain gauge.

16. The apparatus of claim 11, wherein said controller is configured to carry out a method comprising:
(a) providing an additive manufacturing apparatus including a build platform and a light transmissive window, said build platform and said window defining a build region there between, with said window carrying a resin pool, said pool having a resin top surface portion;
(b) advancing said build platform and/or said window towards one another until said build platform contacts said resin top surface portion;
(c) detecting the impact of said build platform with said resin top surface portion; and
(d) determining the fill level of said resin pool from said detected impact.

* * * * *